US011570325B2

(12) United States Patent
Yamada

(10) Patent No.: US 11,570,325 B2
(45) Date of Patent: Jan. 31, 2023

(54) NON-TRANSITORY STORAGE MEDIUM STORING PLURALITY OF INSTRUCTIONS READABLE BY INFORMATION PROCESSING APPARATUS AND SCAN SYSTEM

(71) Applicant: Brother Kogyo Kabushiki Kaisha, Nagoya (JP)

(72) Inventor: Jun Yamada, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/184,896

(22) Filed: Feb. 25, 2021

(65) Prior Publication Data

US 2021/0274060 A1 Sep. 2, 2021

(30) Foreign Application Priority Data

Feb. 27, 2020 (JP) .............................. JP2020-031241

(51) Int. Cl.
*H04N 1/00* (2006.01)
*H04N 1/32* (2006.01)
(52) U.S. Cl.
CPC ....... *H04N 1/00917* (2013.01); *H04N 1/0048* (2013.01); *H04N 1/00925* (2013.01); *H04N 1/00933* (2013.01)
(58) Field of Classification Search
None
See application file for complete search history.

(56) References Cited

U.S. PATENT DOCUMENTS

| 7,072,057 | B1 * | 7/2006 | Hansen | B42C 19/02 |
| | | | | 358/1.13 |
| 8,171,182 | B2 * | 5/2012 | Hattori | H04N 1/00236 |
| | | | | 710/15 |
| 10,230,855 | B1 * | 3/2019 | Sarreo | H04N 1/00962 |
| 2007/0208863 | A1 * | 9/2007 | Otsuka | H04N 1/00222 |
| | | | | 709/227 |

(Continued)

FOREIGN PATENT DOCUMENTS

| JP | 2007-074642 A | 3/2007 |
| JP | 2013-197690 A | 9/2013 |

(Continued)

*Primary Examiner* — Beniyam Menberu
(74) *Attorney, Agent, or Firm* — Burr & Brown, PLLC

(57) ABSTRACT

A non-transitory storage medium stores a plurality of instructions readable by a computer of an information processing apparatus. The information processing apparatus comprises a communication interface for connecting to a scanner. The information processing apparatus includes a first route and a second route. When executed by the computer, the plurality of instructions cause the information processing apparatus to execute a scan control using the first route in which a read result of a document by the scanner is obtained by using the first route after receiving an execution instruction for scanning, determine whether the scan control using the first route has failed or not, and execute a scan control using the second route in which the read result of the document by the scanner is obtained by using the second route when it is determined that the scan control using the first route has failed.

12 Claims, 5 Drawing Sheets

(56) References Cited

U.S. PATENT DOCUMENTS

| | | | | |
|---|---|---|---|---|
| 2007/0211310 A1* | 9/2007 | Kadota | ............. | H04N 1/32502 358/474 |
| 2007/0263942 A1* | 11/2007 | Hirose | .................... | G06T 5/005 382/275 |
| 2008/0239377 A1* | 10/2008 | Inada | ................ | H04N 1/00236 358/1.15 |
| 2008/0256438 A1* | 10/2008 | Harman | ................ | G06F 3/1245 715/239 |
| 2012/0016832 A1* | 1/2012 | Berard | ................ | G06F 40/258 706/47 |
| 2012/0127541 A1* | 5/2012 | Kishida | ............. | H04N 1/00344 358/474 |
| 2012/0287469 A1* | 11/2012 | Tomiyasu | .......... | H04N 1/00954 358/1.15 |
| 2013/0033718 A1* | 2/2013 | Tsujimoto | .......... | H04N 1/00464 358/1.13 |
| 2014/0002840 A1* | 1/2014 | Takano | ............. | H04N 1/00225 358/1.13 |
| 2016/0072971 A1* | 3/2016 | Ozaki | ................ | H04N 1/32507 358/1.15 |
| 2018/0367685 A1* | 12/2018 | Kuno | ................ | H04N 1/00854 |
| 2019/0068828 A1* | 2/2019 | Yamada | ............. | H04N 1/32797 |
| 2019/0222707 A1 | 7/2019 | Nojiri et al. | | |

FOREIGN PATENT DOCUMENTS

| | | |
|---|---|---|
| JP | 2019-046075 A | 3/2019 |
| JP | 2019-125873 A | 7/2019 |

\* cited by examiner

NON-TRANSITORY STORAGE MEDIUM STORING PLURALITY OF INSTRUCTIONS READABLE BY INFORMATION PROCESSING APPARATUS AND SCAN SYSTEM

CROSS REFERENCE TO RELATED APPLICATION

The present application claims priority from Japanese Patent Application No. 2020-031241, which was filed on Feb. 27, 2020, the disclosure of which is herein incorporated by reference in its entirety.

BACKGROUND

The following disclosure relates to a non-transitory storage medium storing a plurality of instructions incorporated in an information processing apparatus capable of communicating with a scanner, and a scan system. More specifically, the disclosure relates to a technique of switching routes of processing with respect to image data between the scanner and the information processing apparatus.

In the information processing apparatus capable of communicating with devices such as a scanner, there is known a technique in which, when an error occurs in execution of a scan job, the scan job is ended after notifying a user of the error. For example, the conventional information processing apparatus displays an error screen and ends the scan processing in a case where an error signal is inputted to a scanner driver or a scanner program after scan processing is started.

SUMMARY

In recent years, there is provided an information processing apparatus having a so-called driverless scanning function which allows the scanner to read a document in accordance with a prescribed standard without using the scanner driver as typified by, for example, AirPrint (registered trademark). In such information processing apparatus, a scan instruction is transmitted to the scanner in accordance with the prescribed standard by using a general-purpose scan control function provided by an operating system (hereinafter referred to as "OS"). Then, the scanner reads an image of the document and transmits image data as a read result to the information processing apparatus in accordance with the prescribed standard.

When using the general-purpose scan control function, the number of available items of scan settings tends to be small and there is a case where it is difficult to provide an image with user's desired quality. It can be considered that a particular scan control function corresponding to a particular scanner is separately provided for realizing more detailed scan settings. For example, the information processing apparatus provided with the particular scan control function can add scan settings specialized to the scanner to a scan instruction. It is also possible to, for example, correct the image data as the read result.

In the above information processing apparatus, execution of the scan job is ended when the error occurs in either case of the general-purpose scan control function and the particular scan control function, which may impose a burden on the user.

An aspect of the disclosure relates to a technique capable of increasing a possibility of obtaining the read result while suppressing the burden of the user even when an error which can end the scan job occurs.

In one aspect of the disclosure, a non-transitory storage medium stores a plurality of instructions readable by a computer of an information processing apparatus. The information processing apparatus includes a communication interface for connecting to a scanner. The information processing apparatus includes a first route and a second route each as an obtainment route used for processing of obtaining a read result of the scanner that reads a document. When executed by the computer, the plurality of instructions cause the information processing apparatus to execute a scan control using the first route in which the read result of the document by the scanner is obtained by using the first route after receiving an execution instruction for scanning, determine whether the scan control using the first route has failed or not, and execute a scan control using the second route in which the read result of the document by the scanner is obtained by using the second route when it is determined that the scan control using the first route has failed.

In another aspect of the disclosure, A scan system includes an information processing apparatus, and a scanner. Communication between the information processing apparatus and the scanner are executed. The information processing apparatus includes a first route and a second route each as an obtainment route used for processing of obtaining a read result of the scanner that reads a document, and a controller. The controller is configured to execute a scan control using the first route in which the read result of the document by the scanner is obtained by using the first route after receiving an execution instruction for scanning instruction, determine whether the scan control using the first route has failed or not, and execute a scan control using the second route in which the read result of the document by the scanner is obtained by using the second route when it is determined that the scan control using the first route has failed.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, an embodiment embodying a scan system will be explained in detail with reference to the attached drawings. The embodiment discloses a scan system including a personal computer (hereinafter referred to as "PC") and a scanner connected to the PC.

Figure 1:
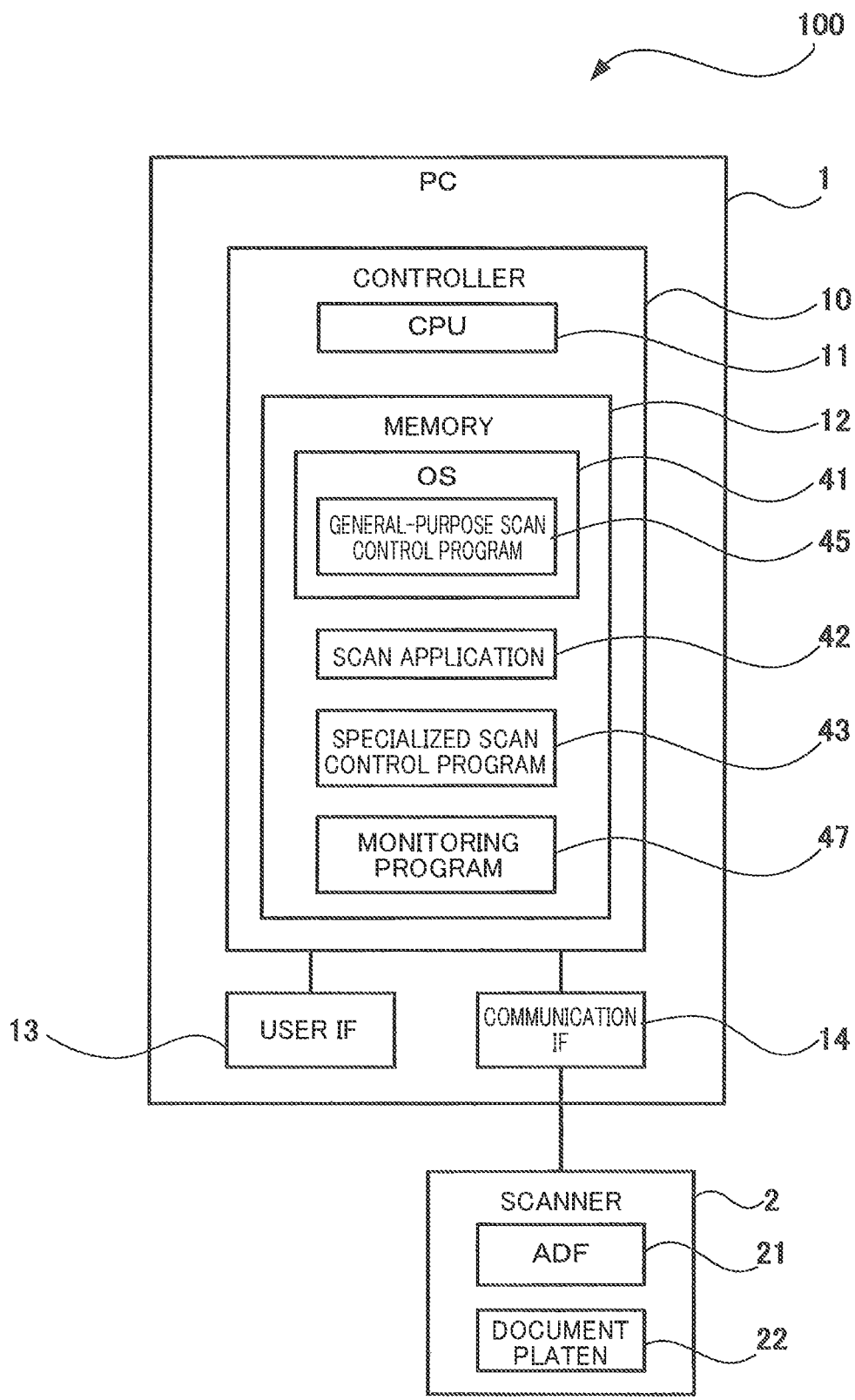
FIG. 1 is a schematic configuration diagram of a scan system according to an embodiment.

A scan system 100 according to an embodiment is a system including a PC 1 and a scanner 2 as illustrated in FIG. 1, and the PC 1 and the scanner 2 are connected to each other. The PC 1 is an apparatus executing transmission of a scan execution instruction to the scanner 2, reception of image data from the scanner 2, edition of the received image data and the like. The PC 1 is an example of an information processing apparatus. For example, a smartphone or a tablet computer may be used instead of the PC 1.

The scanner 2 is a device having a communication function with respect to the PC 1, and an image reading function configured to read an image of a document and obtain image data. The scanner 2 according to the embodiment includes an Auto Document Feeder (hereinafter referred to as "ADF") 21 and a document platen 22, and the scanner 2 can read the document placed on either of them. The scanner 2 receives designation of a position of the document by a scan command. In a case where the designation of the position of the document is not contained in the scan command, the scanner 2 reads the document placed on the ADF 21 when the document is placed on the ADF 21, and the scanner 2 reads the document placed on the document platen 22 when the document is not placed on the ADF 21. The scanner 2 is not limited to a device with a single function of scanning but may be, for example, a multifunction device, a copy machine, or a FAX machine.

The PC 1 according to the embodiment includes a controller 10 having a CPU 11 and a memory 12 as illustrated in FIG. 1. The PC 1 also includes a user interface (hereinafter referred to as "user IF") 13 and a communication interface (hereinafter referred to as "communication IF") 14, and the user IF 13 and the communication IF 14 are electrically connected to the controller 10. The controller 10 in FIG. 1 is a general term used when hardware and software used for controlling the PC 1 are collectively called, which does not always represent single hardware existing in the PC 1.

The CPU 11 executes various processing in accordance with programs read out from the memory 12 or based on operations of a user. The memory 12 is a storage area for storing various programs such as a startup program for starting the PC 1 and various application programs (hereinafter referred to as "applications") for using the scanner, various data such as image data and document data, and various setting information. The memory 12 is also used as a work area when various processing is executed.

The user IF 13 is, for example, a touch panel, and the touch panel includes hardware configured to display a screen for notifying the user of information, and hardware configured to receive operations by the user. The user IF 13 may include a pair of a display and a keyboard, a mouse, or a trackball.

The communication IF 14 includes hardware for communicating with external devices such as the scanner 2. A communication standard of the communication IF 14 includes Ethernet (registered trademark), Wi-Fi (registered trademark), and the like, and the communication IF 14 may include standards for wired and wireless communications. The communication IF 14 may also include a plurality of configurations conforming to a plurality of communication standards. In the scan system 100 according to the embodiment, the PC 1 communicates with the scanner 2, for example, by wireless communication complying with the Wi-Fi standard through common access points or by wireless communication by direct connection not through an access point. A communication system between the PC1 and the scanner 2 may be wired communication using, for example, a USB cable or may be wireless communication conforming to other standards such as Bluetooth (registered trademark).

The memory 12 of the PC 1 stores various data and various programs including an OS 41, a scan application 42, a specialized scan control program 43, and a monitoring program 47 as illustrated in FIG. 1. A general-purpose scan control program 45 is incorporated in the OS 41. Both the specialized scan control program 43 and the general-purpose scan control program 45 are control programs for allowing the scanner 2 to execute scanning. The OS 41 is, for example, iOS (registered trademark), Android (registered trademark), Microsoft Windows (registered trademark), mac OS (registered trademark), or Linux (registered trademark).

The scan application 42 receives user's instructions such as a designation of a device allowed to execute scanning, a designation of a saving location of a read result, an instruction for execution of scanning, and various scan settings. The scan application 42 may further receive display or edition of an image as the read result received from the scanner. The scan application 42 is an example of a plurality of instructions.

The specialized scan control program 43 is a specialized program configured to control the operation of the scanner so as to conform to a model of the scanner. The specialized scan control program 43 is a program conforming to only scanners of a particular model, and the specialized scan control program 43 does not conform to scanners other than the scanners of the particular model, such as scanners of other manufacturers' models. The specialized scan control program 43 can conform to all detailed scan settings executable by conforming scanners. The specialized scan control program 43 may also have a function of searching for conforming scanners by itself and a function of correcting image data obtained from the scanner. The PC 1 has the specialized scan control program 43 conforming to the scanner 2 in the scan system 100 according to the embodiment.

The general-purpose scan control program 45 is a program configured to control the operation of the scanner based on a prescribed standard. The general-purpose scan control program 45 is a program using a scan control function possessed by the OS 41, and the general-purpose scan control program 45 is a standard program provided by the OS 41. The general-purpose scan control program 45 is a general-purpose program conforming to scanners in a plurality of models supporting the prescribed standard. Accordingly, scanners made by any manufacturer can execute scanning based on the standard as long as the scanners have the function corresponding to the general-purpose scan control program 45. The OS 41 has a function in which, for example, when the scanner is newly connected to the PC1, the OS 41 determines whether the general-purpose scan control program 45 is applicable to the scanner or not, and the OS 41 registers information of the corresponding scanner in the memory 12.

As the general-purpose scan control program 45 is a general-purpose program conforming to scanners of the plurality of models, acceptable scan settings are limited to general settings. Accordingly, the general-purpose scan control program 45 does not always accept all scan settings executable by a designated scanner. As scan systems using the general-purpose scan control program 45, for example, Airprint, Mopria (registered trademark) can be cited. The scanner 2 in the scan system 100 according to the embodiment supports the standard of the general-purpose scan control program 45.

The monitoring program 47 is a program having a function of monitoring the status of the scanner 2. The monitoring program 47 is a program, for example, configured to obtain status information of the scanner 2 periodically and storing the latest status information in the memory 12. As the status information, for example, there are "ready", "reading" and "error" statuses. The status information of the error status further includes information of a cause of the error. As causes of the error, there are, for example, document jam, no document, cover open, and the like.

Figure 2:
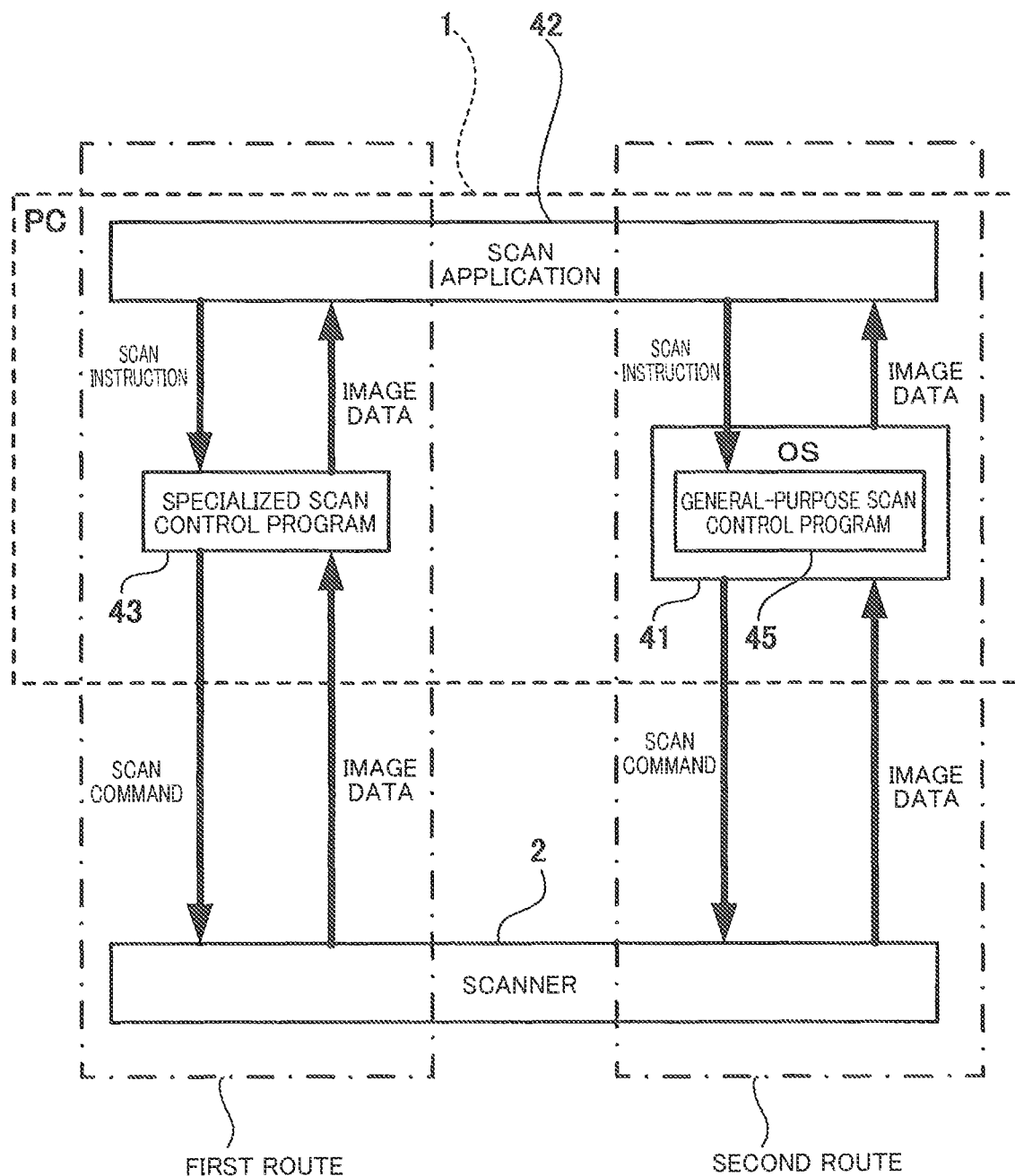
FIG. 2 is an explanatory diagram illustrating two kinds of scan routes.

The scan system 100 according to the embodiment has two kinds of routes as obtaining routes for allowing the scanner 2 to read the image of the document and obtaining the read result as illustrated in FIG. 2. A first route is a route of processing allowing the scanner 2 to execute scanning by using the specialized scan control program 43, and a second route is a route of processing allowing the scanner 2 to execute scanning by using the general-purpose scan control program 45. The first route is an example of a first route, and the second route is an example of a second route.

The scan application 42 according to the embodiment is a program capable of executing both processing in the first route and processing in the second route. When executing processing in the first route, the scan application 42 passes a scan instruction to the specialized scan control program 43. The scan application 42 transmits the scan command to the scanner 2 by using the specialized scan control program 43 and receives image data transmitted from the scanner 2 through the specialized scan control program 43. As the specialized scan control program 43 is not contained in the OS 41, the PC 1 does not use the scan control function (for example, the general-purpose scan control program 45) contained in the OS 41 when executing processing in the first route. As the first route uses the specialized scan control program 43, the first route conforms to all scan settings available in the scanner 2.

When executing processing in the second route, the scan application 42 passes the scan instruction to the OS 41. The OS 41 transmits the scan command to the scanner 2 by using the general-purpose scan control program 45, and the scan application 42 receives image data transmitted from the scanner 2 through the OS 41. The second route uses the general-purpose scan control program 45 which is the scan control function included in the OS 41, therefore, it is not always possible to accept all scan settings available in the scanner 2. For example, the general-purpose scan control program 45 does not conform to a scan setting of high resolution with which only the particular model can deal. Accordingly, scan settings with resolutions which can be dealt with by many models, namely, scan settings with resolutions other than the high resolution are used in the second route.

The scan application 42 can obtain status information of the scanner 2 by inquiring of the monitoring program 47 as required. The scan application 42 may also have a function of obtaining a scan completion notification from the scanner 2 through the specialized scan control program 43 or the general-purpose scan control program 45.

Next, a procedure of scan processing executed by the PC 1 in the scan system 100 according to the embodiment will be explained with reference to a flowchart of FIG. 3. The scan processing is executed by the CPU 11 of the PC1 when the scan application 42 which is running receives an instruction for starting the scan processing.

In the scan processing, the CPU 11 obtains a priority route stored in the memory 12 first (S101), and the CPU 11 determines whether the priority route is the first route or not (S102). The scan application 42 stores information of any one route of the first route and the second route in the memory 12 as the priority route which is a default obtainment route preferentially executed at that point. The priority route may be determined in accordance with the connected model or may be determined in accordance with the function desired to be used by the user. When the scan application 42 receives the instruction for executing scanning, the scan application 42 reads out the route stored as the priority route first, and determines whether the route is the first route or the second route. Note that the scan application 42 of the embodiment sets, as an example, an initial value of the priority route to the first route.

When it is determined that the priority route is the first route (S102: YES), the CPU 11 accepts scan settings available in the first route (S103). The first route is a route using the specialized scan control program 43 as described above, the specialized scan control program 43 can accept all settings available in the scanner 2. In the case where the scanner 2 is a device which can execute reading with high resolution, the CPU 11 receives designation of high resolution as resolution for reading at S103.

When the selection of the scan settings is completed and the instruction for executing scanning is received, the CPU 11 executes first scan processing (S104). The first scan processing is processing executing first scan control as scan control in the first route.

Figure 4:
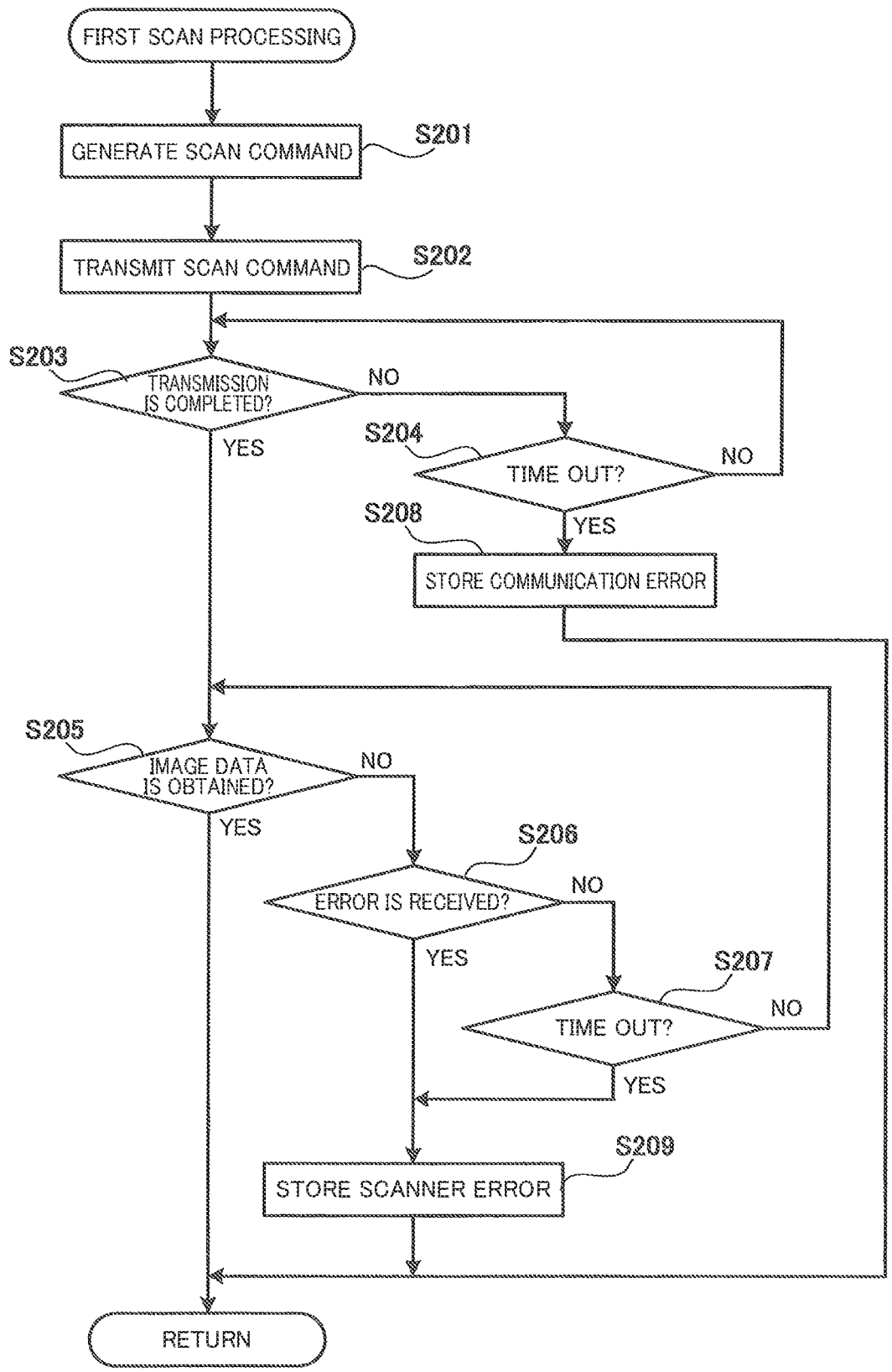
FIG. 4 is a flowchart illustrating a procedure of first scan processing.

A procedure of the first scan processing will be explained with reference to a flowchart of FIG. 4. In the first scan processing, the CPU 11 generates a scan command using the specialized scan control program 43 based on the scan settings accepted at S103 of the scan processing (S201). The CPU 11 further starts transmission of the generated scan command to the scanner 2 (S202).

Then, the CPU 11 determines whether the transmission of the scan command has been normally completed or not (S203). When it is determined that the transmission has not been completed (S203: NO), the CPU 11 determines whether the operation has timed out or not in the communication with respect to the scanner 2 (S204). For example, there is a case where transmission of the scan command is not capable of being normally completed because the scanner 2 is off-line or a communication failure occurs. When it is determined that the operation has not timed out (S204: NO), the CPU 11 returns to S203 and waits until the transmission is completed or the operation times out.

When it is determined that the transmission of the scan command has been completed (S203: YES), the CPU 11 determines whether image data as the read result has been obtained from the scanner 2 or not (S205). When the scan command is received, the scanner 2 executes scanning based on the received command, and transmits image data as the read result to the PC 1. When the scanning by the scanner 2 has been normally completed, the PC 1 can obtain image data transmitted from the scanner 2. When it is determined that the image data has been obtained (S205: YES), the CPU 11 ends the first scan processing and returns to scan processing.

When it is determined that the image data has not been obtained (S205: NO), the CPU 11 determines whether information of an error has been received from the scanner 2 or not (S206). There is a case where the scanner 2 transmits response information indicating the error to the PC 1 when the scanning has not been completed due to an error that has occurred in the middle of scanning. As examples of errors that occur in the middle of execution of scanning, no document in the ADF 21, document jam in the ADF 21, and the like with respect to the reading instruction in the ADF 21 are cited.

When it is determined that the information of the error has not been received (S206: NO), the CPU 11 determines whether a predetermined period of time has passed without receiving information of the error and image data, and operation has timed out (S207). For example, in a case where the power of the scanner 2 is turned off before the scanner 2 transmits information of the error, or in a case where a communication failure occurs, it is highly likely that the operation times out while not receiving information of the error and image data. When it takes time to read the document, it is likely that a problem occurs in the body of the scanner 2 or in the communication between the PC 1 and the scanner 2, which can be determined to be a failure.

When it is determined that the operation has not timed out (S207: NO), the CPU 11 returns to S205 and waits until image data is obtained, information of the error is received, or the operation times out.

When it is determined that the operation has timed out during transmission of the scan commend (S204: YES), the CPU 11 stores a communication error as information of a cause of an error in the memory 12 (S208). When information of the error is received after the transmission of the scan command has been completed (S206: YES), or when it is determined that the operation times out without receiving information of the error and image data (S207: YES), the CPU 11 stores a scanner error as information of the cause of the error in the memory 12 (S209). The scanner error contains an error code whereby the details of the cause of the error can be respectively distinguished. After S208 or S209, the CPU 11 ends the first scan processing and returns to the scan processing.

Figure 3:
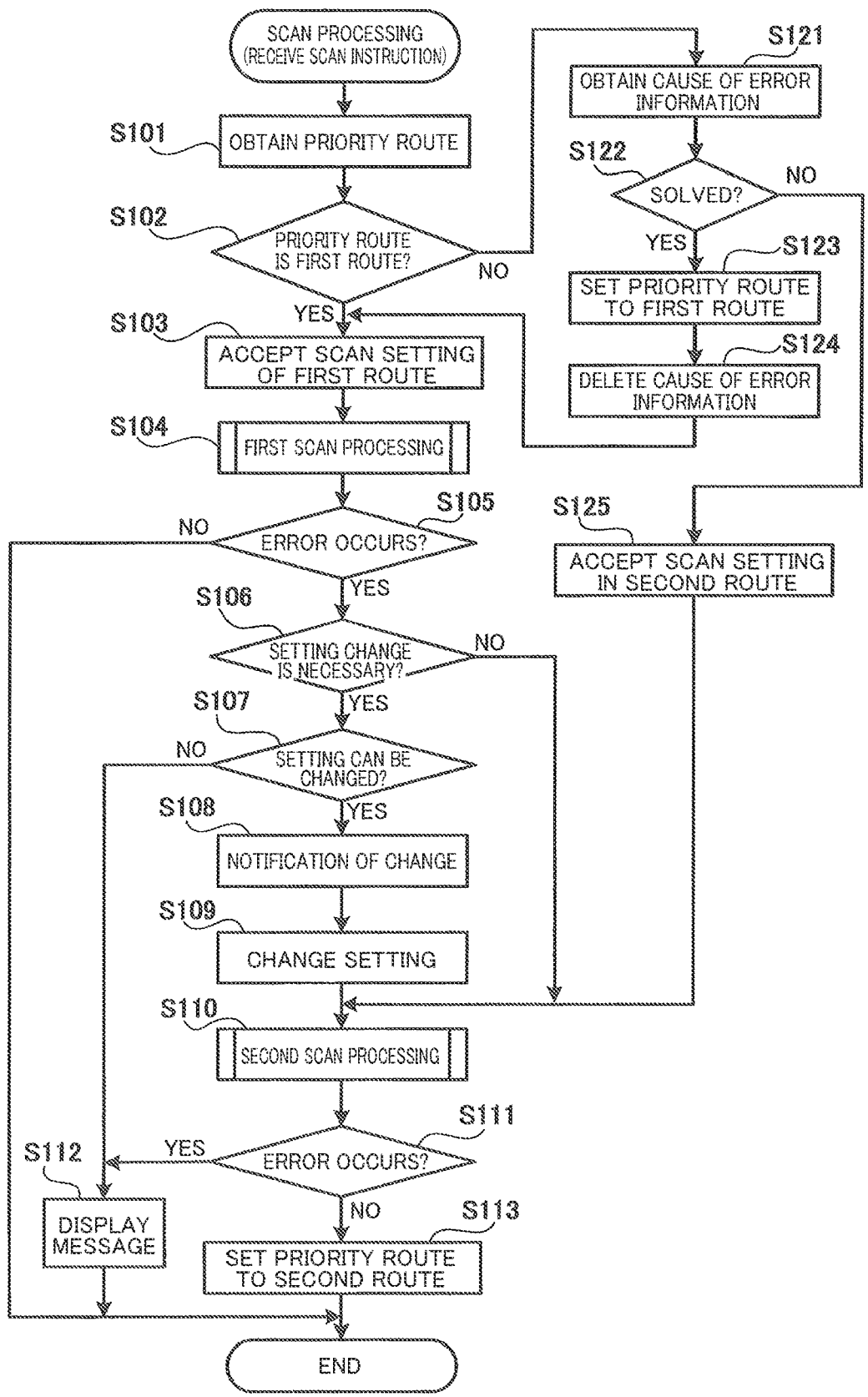
FIG. 3 is a flowchart illustrating a procedure of scan processing.

The explanation returns to the scan processing in FIG. 3. In the scan processing, the CPU 11 determines whether the error has occurred in the first can processing or not after the first scan processing of S104 (S105). When it is determines that the error has not occurred (S105: NO), the CPU 11 ends the scan processing. When the error has not occurred, the CPU 11 has successfully obtained the read result in the first scan processing.

The CPU 11 may determine that a determination is YES at S105 also in a case where the error has occurred in processing by the specialized scan control program 43 with respect to the obtained image data even when the error has not occurred in the middle of the scanning by the scanner 2. For example, a setting of correction processing for correcting the obtained image data can be executed in the scan setting in the first route. As the correction processing, for example, there are removal of a blank paper and character recognition. When the scan settings contain the setting for executing the correction processing and the error has occurred in the middle of the correction processing, the CPU 11 determines that the determination is YES at S105. When correction with respect to image data as the read result fails, it is likely that an abnormality occurs in the program, which can be determined as a failure. In this case, the CPU 11 stores the cause of the error in the memory 12, for example, as a correction error.

It is also preferable that the CPU 11 determines that the determination is YES at S105 in a case where an abnormality determination about whether an abnormality occurs in image data obtained from the scanner 2 has been made and an abnormality has been found. As abnormalities of image data include, for example, blank paper data, black solid, and much noise. When there is an abnormality in image data as the read result, it is unlikely that the image is one desired by the user, which can be determined as a failure. In this case, the CPU 11 stores the cause of the error into the memory 12, for example, as an image quality error.

When it is determined that the error has occurred (S105: YES), the CPU 11 determines whether it is necessary to change the scan setting for executing scanning in the second route or not (S106). As described above, available scan settings differ in the first route and the second route, and there are scan settings available in the first route but unavailable in the second route. Accordingly, the CPU 11 determines whether scan settings set in the scan instruction of this time contain a scan setting unavailable in the second route or not at S106.

For example, the scan setting of reading with high resolution is an available setting in the first route using the specialized scan control program 43; however, the can setting with high resolution is an unavailable setting in the second route using the general-purpose scan control program 45. Accordingly, when the designated scan settings contain the reading with high resolution, the CPU 11 determines that it is necessary to change the scan settings. The scan application 42 stores, for example, a list of available settings in the first route and a list of available settings in the second route in the memory 12, and when the designated scan settings are contained in the stored list of the available settings in the second route, the CPU 11 determines that the process is YES at S106.

When it is determined that it is necessary to change the scan setting (S106: YES), the CPU 11 determines whether the unavailable setting in the second route can be changed or not (S107). For example, in a case where the setting is the scan setting of reading with high resolution, scanning in the second route can be executed by changing the resolution to be lower. The scan application 42 stores setting change values for changing the settings which are available in the first route and unavailable in the second route to make the settings available in the second route in the memory 12. When the setting change values are stored with respect to all settings unavailable in the second route contained in the scan settings, the CPU 11 determines that the process is YES at S107.

On the other hand, there exist settings available in the first route and unavailable in the second route, and the settings are incapable of being available by changing the settings. For example, push-scan and removal of reflection on the back at both sides reading correspond to settings incapable of being changed. These processing is unavailable in the second route, and execution of scanning in the second route is not enabled by changing the settings. The scan application 42 stores the list of settings available in the first route, unavailable in the second route, and incapable of being changed in the memory 12. When the settings incapable of being changed are contained in the scan settings, the CPU 11 determines that the process is NO at S107.

When it is determined that the setting can be changed (S107: YES), the CPU 11 controls the user IF 13 to display a message indicating that scan setting is changed so as to execute scanning in the second route (S108). The CPU 11 further changes the scan setting so as to be available in the second route (S109). When the unavailable setting is automatically changed into the available setting, a failure in reading can be avoided.

It is preferable that the CPU 11 displays a message specifically indicating which setting is changed and how the setting is changed at S108. When the user is notified of the contents of the change, the user can recognize that the setting has been automatically changed or the setting is not reflected on the read result. It is also preferable to get approval from the user at S108. When the change is not approved, the scan processing may be ended without changing the setting.

Then, after S109, or when it is determined that the change of scan setting is not necessary (S106: NO), the CPU 11 executes second scan processing (S110). The second scan processing is processing configured to execute a second scan control as a scan control in the second route. As the scan control using the route different from the first route is executed in the second route, it is likely that scanning can be completed in the second route if an error occurs in the first route. For example, in a case where a scan error occurs due to some abnormality generated in the processing by the scanner 2 in reading with high resolution, there is a possibility that the scanning can be completed by reducing the resolution and executing scanning in the second route.

Figure 5:
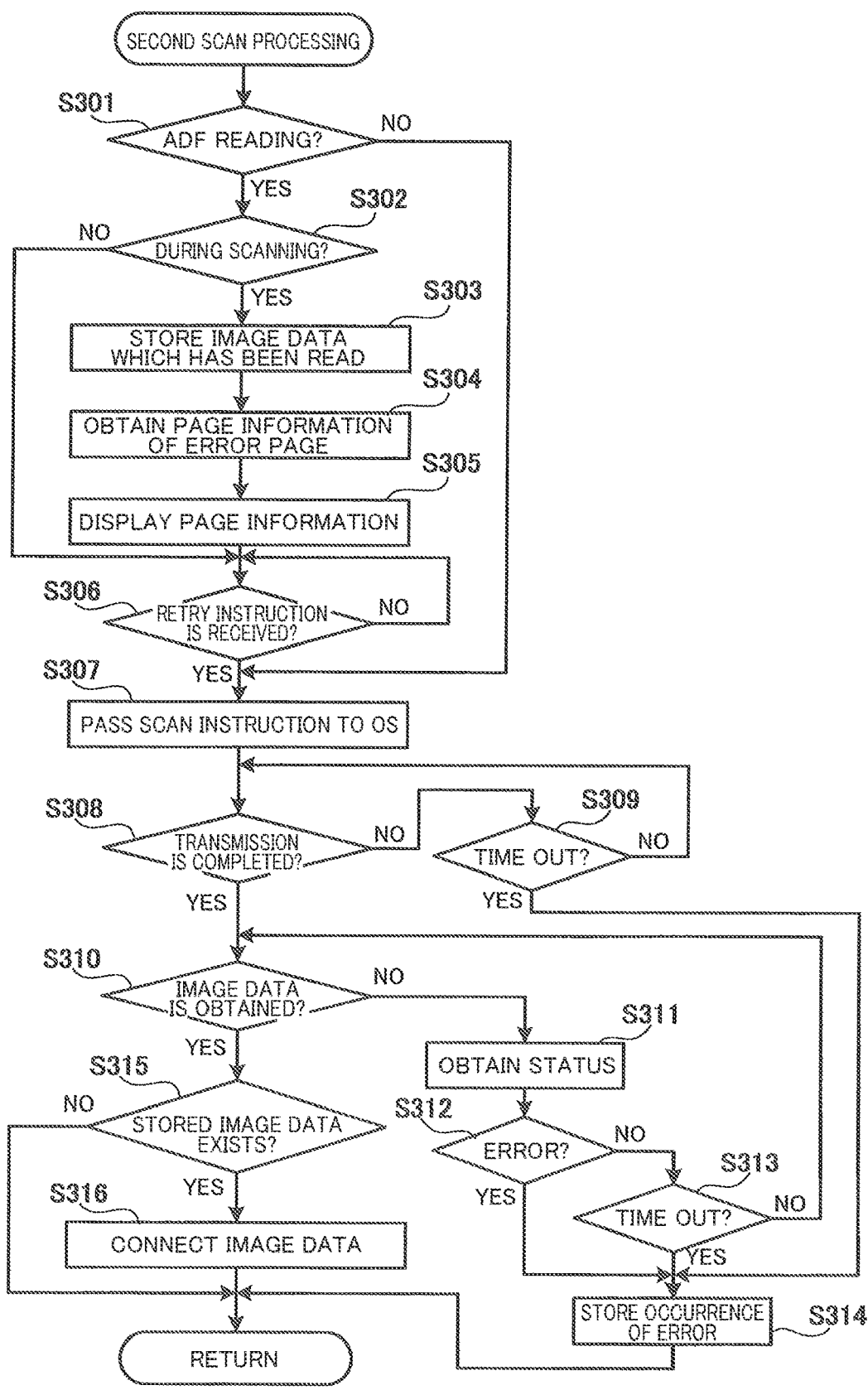
FIG. 5 is a flowchart illustrating a procedure of second scan processing

A procedure of the second scan processing will be explained with reference to a flowchart of FIG. 5. In the second scan processing, the CPU 11 determines, first, whether the setting corresponds to ADF reading in which a document placed on the ADF 21 is read or not (S301). The CPU 11 may determine, for example, whether the scan setting is the setting of the ADF reading or not or may determine the setting by obtaining information whether the document exists on the ADF 21 or not from the scanner 2.

When it is determined that the setting corresponds to the ADF reading (S301: YES), the CPU 11 determines whether the second scan processing is started by an error which has occurred in the middle of execution of scanning in the first route or not (S302). For example, when it is determined YES at S206 or S207 in the first scanning processing, it is possible that the processing is in the middle of scanning. If the error has occurred in the middle of scanning in the ADF reading, there is a possibility that the scanner 2 has read a part of a plurality of pages of the document and image data has been partially obtained.

When it is determined that the error is an error which has occurred in the middle of the execution of scanning in the first route (S302: YES), the CPU 11 obtains the part of image data which has been read by the scanner 2 and stores the data into the memory 12 as a temporary file (S303). The temporary file stored at S303 is an example of a first read result.

If it is configured that image data is transmitted to the PC 1 every time the scanner 2 reads one page of the document, the CPU 11 stores the received image data in the memory 12. In this case, the CPU 11 generates the temporary file by adding information indicating that the stored image data is partial data of the scan job which is in the middle of the execution of scanning. If it is configured that image data is collectively transmitted to the PC 1 after the scanner 2 reads all pages, image data corresponding to pages which has been read by the scanner 2 is stored in the scanner 2. In this case, the CPU 11 instructs the scanner 2 to transmit the read image data, and receives the image data and stores the data in the memory 12 as the temporary file.

The CPU 11 also obtains page information indicating pages which have been successfully read before the occurrence of the error (S304), and controls the user IF 13 to display the obtained page information (S305). Furthermore, the CPU 11 displays a message for setting the document of pages subsequent to the pages indicated by the page information and prompting the user to input an instruction for a retry. The user can easily set the remaining document correctly by displaying the pages which have been successfully read. The page information may be information of a page where the error has occurred.

After A305, or when it is determined that the error is not an error which occurs in the middle of execution of scanning (S302: NO), the CPU 11 determines whether the instruction for the retry for restarting reading has been received or not (S306). When it is determined that the instruction for the retry has not been received (S306: NO), the CPU waits until receiving the instruction.

When it is determined that the instruction for the retry has been received (S306: YES), or when it is determined that the setting is not the ADF reading (S301: NO), the CPU 11 passes a scan instruction for causing the scanner 2 to execute scanning in the second route to the OS 41 (S307). When the OS 41 receives the scan instruction from the scan application 42, the OS 41 generates a scan command by using the general-purpose scan control program 45 and transmits the generated scan command to the scanner 2.

As it is necessary to set the document again in the case of the ADF reading, the retry is not started immediately, and the retry is executed after waiting for the instruction for the retry. On the other hand, in a case of reading the document placed on the document platen 22, not in the case of the ADF reading, image data for a page has not been obtained and it is not necessary to set the document again, therefore, it can be expected that reading is executed early by executing the retry immediately.

Then, the CPU 11 determines whether the transmission of the scan command has been normally completed or not (S308). When it is determined that the transmission has not been completed (S308: NO), the CPU 11 determines whether the operation has timed out or not in the communication with respect to the scanner 2 (S309). S309 is the same processing as S204 in the first scan processing. When it is determined that the operation has not been timed out (S309: NO), the CPU 11 returns to S308 and waits until the transmission is completed or the operation times out.

When it is determined that the transmission of the scan command is completed (S308: YES), the CPU 11 determines whether image data as the read result has been obtained from the scanner 2 or not (S310). When it is determined that the image data has not been obtained (S310: NO), the CPU 11 obtains status information of the scanner 2 (S311). The CPU 11 obtains the status information of the scanner 2, for example, by inquiring of the monitoring program 47. In a case where the OS 41 monitors the status of the scanner 2, the CPU 11 may obtain status information from the OS 41.

Then, the CPU 11 determines whether the status of the scanner 2 indicated by the obtained status information is a status indicating the error or not (S312). When it is determined that the status is not the status indicating the error (S312: NO), the CPU 11 determines whether the operation has timed out or not (S313). S313 is the same processing as S207 in the first scan processing. When it is determined that the operation has not timed out (S313: NO), the CPU 11 returns to S310 and waits until obtaining image data, obtaining status information of the error or the operation times out.

When it is determined that the operation has timed out during transmission of the scan command (S309: YES), when it is determined that the status information indicating the error has been obtained (S312: YES), or when it is determined that the operation has timed out after transmission of the scan command (S313: YES), the CPU 11 stores information indicating that the error has occurred into the memory 12 (S314). When it is possible to obtain the cause of the error, the CPU 11 preferably stores information of the cause in the memory 12.

On the other hand, when the scanning by the scanner 2 has been normally completed, the CPU 11 can obtain image data transmitted from the scanner 2 from the OS 41. When it is determined that the image data has been obtained (S310: YES), the CPU 11 determines whether partial image data stored in the memory 12 as the temporary file exists or not (S315). When it is determined that the partial image data exists (S315: YES), the CPU 11 merges image data obtained by the reading this time with the stored temporary file to make one image data (S316). The image data obtained by the reading this time is an example of a second read result.

As the partial image data obtained by the scanning in the first route is temporarily stored, only the remaining part of the document has to be scanned in the second route. In the embodiment, temporarily-saved image data is merged with the image data obtained by the retry to make one image data automatically, therefore, the labor of the user can be reduced. The reading may be restarted from the failed page, thereby shortening time to be taken for the reading of the retry as compared with a case where the reading is executed from the beginning again.

After S314 or S316, or when it is determined that the partial image data does not exist (S315: NO), the CPU 11 ends the second scan processing and returns to the scan processing. When the partial image data does not exist, the CPU 11 sets image data obtained by the reading this time as the read result.

The explanation returns to the scan processing of FIG. 3. In the scan processing, it is determined whether the error has occurred in the second scan processing after the second scan processing of S110 or not (S111). When it is determined that the error has occurred in the second processing (S111: YES), or when it is determined that it is impossible to change the setting whereby scanning in the second route is enabled (S107: NO), the CPU 11 controls the user IF 13 to display a message indicating that the scanning in the second route has failed (S112), and ends the scan processing.

At S112, it is preferable that the CPU 11 displays information of settings incapable of being changed and information of occurred errors. When the information of settings contains settings unavailable in the scanning in the second route and incapable of being changed, the information of settings is displayed, thereby allows the user to recognize that the scan is incapable of being executed and a cause thereof.

On the other hand, when it is determined that the second scan processing has ended without occurrence of an error (S111: NO), the CPU 11 ends the scan processing after setting the priority route to the second route (S113). In a case where scanning in the second route has been successfully executed when the first route is the priority route and scanning in the first route has failed, it is likely that the scanning succeeds next time by changing the priority route to the second route.

In the case where the scan instruction is received after the priority route has been changed, as explained above, the CPU 11 determines that the priority route is not the first route at S102. Then, when it is determined that the priority route is not the first route (S102: NO), the CPU 11 obtains information indicating the cause of the error stored in the memory 12 (S121). When the error has occurred in the first scan processing, information indicating the cause of the error has been stored in the memory 12 at S208 or S209 in the first processing.

Then, the CPU 11 determines whether there is a possibility that the error has been solved or not based on information of the cause of the error (S122). For example, when the cause of the error is a correction error and the specialized scan control program 43 is updated, there is a possibility that the error has been solved. The CPU 11 inquires of a server or the like that delivers the specialized scan control program 43 to the PC 1, thereby determining whether the specialized scan control program 43 has been updated or not.

When the cause of the error is the communication error and a communication mode between the PC 1 and the scanner 2 is updated, there is possibility that the error has been solved. When information of the cause of the error indicates the scanner error or the image quality error, and firmware of the scanner 2 is updated or parts such as a feeder belt or a main board of the scanner 2 has been replaced, there is a possibility that the error has been solved. The CPU 11 can determine whether the update of firmware or the replacement of parts has been executed in the scanner 2 or not by inquiring of the scanner 2.

When it is determined that there is a possibility that the error has been solved (S122: YES), the CPU 11 changes the priority route to the first route (S123). The CPU 11 also deletes the stored cause of the error information (S124), proceeds to S103, and executes the first scan processing. A possibility that the scanning in the first route succeeds is increased when the cause of the error has been solved, therefore, the first route can be preferentially used again by returning the priority route to the first route.

On the other hand, when it is determined that the error has not been solved (S122: NO), the CPU 11 accepts scan settings available in the second route (S125). The second route is the route in which scan processing using the general-purpose scan control program 45 is executed as described above, and there are settings available in the scanner 2 but the scan control program 45 cannot accept. At S125, the CPU 11 accepts only scan settings capable of being designated by scanning in the second route. For example, in the case where the general-purpose scan control program 45 does not conform to the reading with high resolution, the CPU 11 does not accept designation of high resolution as the resolution for reading at S125.

After S125, the CPU 11 proceeds to S110 and executes the second scan processing. It is likely that the error occurs again when scanning in the first route is attempted in a state in which the priority route has been changed to the second route and the error has not been solved. Accordingly, it is highly likely that scanning can be completed earlier by executing scanning in the second route without executing scanning in the first route.

As explained above in detail, when scanning in the first route fails, scanning in the second route is automatically attempted in the scan system 100 according to the embodiment. That is, the retry is automatically executed by being switched to another obtainment route without necessity of a selection operation of the route by the user. The switching of the obtainment route and the retry are automatically executed without ending the scan job even when the scanning fails, therefore, the labor of the user does not increase, and the possibility that the read result can be obtained.

The embodiment is merely an example, and does not limit the disclosure at all. Therefore, various modifications and alterations may naturally occur in the present disclosure within a scope not departing from the gist thereof. For example, the PC and the scanner which constitute the scan system 100 are not limited to one machine respectively, and a plurality of PCs and scanners may exist.

For example, the initial value of the priority route may be the second route and settings to set the second route to the priority route by the user may be accepted. In a case where a plurality of scanners are connected to the PC 1, the priority route may be set to each scanner. When the initial value of the priority route is the second route, the CPU 11 executes the second scanning processing by determining No at S102 and NO at S122 in the scan processing. It is also preferable that the scan processing may be executed by exchanging the first route and the second route during all scan processing in the embodiment.

In the embodiment, the priority route is changed to the second route when scanning in the first route has failed and scanning in the second route has succeeded, however, in a case where scanning in one of the first route and the second route fails, the priority route may be changed regardless of whether the scanning in the other of the first route and the second route succeeds or not.

In a case where the error occurring in the scan control in the priority route is an error not depending on the route, the retry is not always necessary. For example, it is unlikely that scanning succeeds even when the route of scan control is switched in a state in which the scanner 2 is incapable of continuing scanning, for example, due to document jam. Accordingly, when it is determined that the error has occurred at S105 in the scan processing, it is also preferable that a step of determining whether the cause of the error is the scanner error or not is provided, and that the process proceeds to S112 when the cause of the error is the scanner error.

For example, when scanning in the first route fails and is changed to scanning in the second route, the user is notified of the change and the setting is changed if it is necessary to change the setting; however, it is not always necessary that the user is notified of the change. When the setting is merely ignored in the scan processing using the general-purpose scan control program 45, it is not always necessary to change the setting.

For example, when reading fails in the middle of the ADF reading, read results are merged with thereby make one image data, however, the embodiment is not limited to this. For example, reading may be executed again from the first page, results may be outputted as separate files, and it is preferable to inquire of the user about the intention.

The explanation has been made in the present embodiment that there are two kinds of routes applicable in the scan system 100, which are the first route and the second route, however, further other routes may be provided. As other routes, for example, there are a route in which scanning is executed by using a specialized driver in the device, and a route in which scanning is executed by using a scanner driver of another OS. The driver specialized to the device and the scanner driver of another OS are programs incorporated in the OS 41 of the PC 1. In the case of the scan system conforming to other routes, when the error occurs both in the first route and the second route, the retry may be possible in further another route.

In arbitrary flowcharts disclosed in the embodiment, a plurality of processing in a plurality of arbitrary steps may be arbitrarily changed in the execution order or may be executed in parallel in a range not causing discrepancy in the processing contents.

The processing disclosed in the embodiment may be executed by a single CPU, a plurality of CPUs, hardware such as ASIC or combinations of them. The processing disclosed in the embodiment may be realized in various states such as a recording medium recording programs or methods for executing the processing.

What is claimed is:

1. A non-transitory storage medium storing a plurality of instructions readable by a computer of an information processing apparatus, the information processing apparatus comprising a communication interface for connecting to a scanner,
    wherein the information processing apparatus includes a first route and a second route each as an obtainment route used for processing of obtaining a read result of the scanner that reads a document,
    wherein, when executed by the computer, the plurality of instructions cause the information processing apparatus to
        execute a scan control using the first route in which the read result of the document by the scanner is obtained by using the first route after receiving an execution instruction for scanning;
        determine whether the scan control using the first route has failed or not; and
        execute a scan control using the second route in which the read result of the document by the scanner is obtained by using the second route when it is determined that the scan control using the first route has failed,
        when it is determined that the scan control using the first route has failed, determine whether or not an unavailable setting unavailable in the scan control using the second route is contained in scan settings of the scan control using the first route,
        execute the scan control using the second route when it is determined that the unavailable setting is not contained in the scan settings,
        change the unavailable setting to an available setting available in the scan control using the second route when it is determined that the unavailable setting is contained in the scan settings,
        execute the scan control using the second route after the unavailable setting is changed, and
        notify that the scan control using the second route using the unavailable setting is not executed when the unavailable setting is not capable of being changed to the available setting,
    wherein an operating system of the information processing apparatus has a scan control function,
    wherein one of the first route and the second route is a route causing the scanner to execute reading without using the scan control function of the operating system,
    wherein the other of the first route and the second route is a route causing the scanner to execute reading by using the scan control function of the operating system, and
    wherein the unavailable setting, which is unavailable in the scan control using the second route, includes at least one of a push-scan setting and a backside-image-reflection-removing setting.

2. The non-transitory storage medium according to claim 1, wherein, when executed by the computer, the plurality of instructions cause the information processing apparatus to notify a user of contents of change of the scan setting when the unavailable setting is changed to the available setting.

3. The non-transitory storage medium according to claim 1, wherein the information processing apparatus stores one of the first route and the second route as a priority route which is preferentially executed as the obtainment route, and
    wherein, when executed by the computer, the plurality of instructions cause the information processing apparatus to change the priority route from the first route to the second route when it is determined that the scan control using the first route has failed in a state in which the first route is stored as the priority route.

4. The non-transitory storage medium according to claim 3, wherein, when executed by the computer, the plurality of instructions cause the information processing apparatus to change the priority route from the second route to the first route when a cause of a failure in the scan control using the first route is solved after the priority route is changed from the first route to the second route.

5. The non-transitory storage medium according to claim 1, wherein the scan control using the first route contains processing of correcting image data as the read result, and
wherein, when the correction with respect to the image data as the read result fails, the scan control using the first route is determined to be failed.

6. The non-transitory storage medium according to claim 1, wherein the scan control using the first route contains processing of determining whether an abnormality occurs in the image data as the read result or not, and
wherein, when it is determined that the abnormality occurs in the image data as the read result, the scan control using the first route is determined to be failed.

7. The non-transitory storage medium according to claim 1, wherein, when the read result is not obtained after a predetermined period of time has passed from a timing when an instruction causing the scanner to read the document is outputted, the scan control using the first route is determined to be failed.

8. The non-transitory storage medium according to claim 1, wherein the information processing apparatus stores a first execution program causing the information processing apparatus to receive the read result from the scanner by using the first route, and a second execution program different from the first execution program and causing the information processing apparatus to receive the read result from the scanner by using the second route.

9. The non-transitory storage medium according to claim 8, wherein the information processing apparatus includes an operating system, and wherein the second execution program is used as a scan control function of the operating system and the first execution program is not used as the scan control function of the operating system.

10. A non-transitory storage medium storing a plurality of instructions readable by a computer of an information processing apparatus, the information processing apparatus comprising a communication interface for connecting to a scanner,
wherein the information processing apparatus includes a first route and a second route each as an obtainment route used for processing of obtaining a read result of the scanner that reads a document,
wherein, when executed by the computer, the plurality of instructions cause the information processing apparatus to
execute a scan control using the first route in which the read result of the document by the scanner is obtained by using the first route after receiving an execution instruction for scanning,
determine whether or not the scan control using the first route has failed, and
execute a scan control using the second route in which the read result of the document by the scanner is obtained by using the second route when it is determined that the scan control using the first route has failed, and
wherein, when it is determined that the scan control using the first route has failed,
in a case that scanning of a document placed on an auto document feeder of the scanner has failed in the scan control using the first route, the scan control using the second route is executed after an executing instruction for a retry is accepted, and
in a case that scanning of a document placed on a document platen different from the auto document feeder has failed in the scan control using the first route, the scan control using the second route is executed without accepting the executing instruction for the retry.

11. A non-transitory storage medium storing a plurality of instructions readable by a computer of an information processing apparatus, the information processing apparatus comprising a communication interface for connecting to a scanner,
wherein the information processing apparatus includes a first route and a second route each as an obtainment route used for processing of obtaining a read result of the scanner that reads a document,
wherein, when executed by the computer, the plurality of instructions cause the information processing apparatus to
execute a scan control using the first route in which the read result of the document by the scanner is obtained by using the first route after receiving an execution instruction for scanning,
determine whether or not the scan control using the first route has failed, and
execute a scan control using the second route in which the read result of the document by the scanner is obtained by using the second route when it is determined that the scan control using the first route has failed,
wherein, in the scan control using the second route, when scanning of a document placed on an auto document feeder of the scanner has failed in the scan control using the first route, a first read result is obtained so as to be stored into a memory, and a second read result obtained by the scan control using the second route is obtained after storing the first read result, the first read result being information of successfully-scanned pages by the scan control using the first route, and
wherein, in the second control using the second route, one read result is obtained by merging the first read result with the second read result.

12. The non-transitory storage medium according to claim 11, wherein, in the scan control using the second route, when the scanning of the document placed on the auto document feeder of the scanner has failed in the scan control using the first route, obtained information related to the successfully-scanned pages is displayed.

* * * * *